United States Patent
Lerch et al.

(10) Patent No.: US 12,265,605 B2
(45) Date of Patent: Apr. 1, 2025

(54) DIGITAL CREDENTIAL REVOCATION

(71) Applicant: Apple Inc., Cupertino, CA (US)

(72) Inventors: Matthias Lerch, San Francisco, CA (US); Florian Galdo, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 17/943,155

(22) Filed: Sep. 12, 2022

(65) Prior Publication Data

US 2023/0004636 A1    Jan. 5, 2023

Related U.S. Application Data

(63) Continuation of application No. 16/578,198, filed on Sep. 20, 2019, now Pat. No. 11,443,028.
(Continued)

(51) Int. Cl.
*G06F 21/45* (2013.01)
*H04L 9/40* (2022.01)
*H04W 12/06* (2021.01)

(52) U.S. Cl.
CPC ............ *G06F 21/45* (2013.01); *H04L 63/101* (2013.01); *H04W 12/068* (2021.01)

(58) Field of Classification Search
CPC .............................. G06F 21/45; H04L 63/101
See application file for complete search history.

(56) References Cited

U.S. PATENT DOCUMENTS

| | | |
|---|---|---|
| 6,092,201 A | 7/2000 | Turnbull |
| 9,087,187 B1 | 7/2015 | Doane |
| (Continued) | | |

FOREIGN PATENT DOCUMENTS

| | | |
|---|---|---|
| CN | 103563474 | 2/2014 |
| JP | 2005-303993 | 1/2005 |
| (Continued) | | |

OTHER PUBLICATIONS

Chinese Office Action from Chinese Patent Application No. 201910910874.3, dated Feb. 14, 2022, 10 pages including English language summary.
(Continued)

*Primary Examiner* — Chau Le
(74) *Attorney, Agent, or Firm* — BAKERHOSTETLER

(57) ABSTRACT

A device implementing a digital credential revocation system includes at least one processor configured to maintain a valid digital credential list, a revocation list, and a synchronization counter value. The at least one processor is configured to transmit a request to synchronize the valid digital credential list with an electronic device, the request including the valid digital credential list and the revocation list. The at least one processor is further configured to, in response to receipt of an updated valid digital credential list from the electronic device: clear the revocation list, replace the valid digital credential list with the updated valid digital credential list, and increment the synchronization counter value, and fulfill a received credential maintenance request when the received credential maintenance request comprises an other synchronization counter value that is greater than or equal to the incremented synchronization counter value, otherwise deny the received credential maintenance request.

20 Claims, 13 Drawing Sheets

Related U.S. Application Data

(60) Provisional application No. 62/737,820, filed on Sep. 27, 2018.

(56) References Cited

U.S. PATENT DOCUMENTS

| | | | |
|---|---|---|---|
| 9,877,188 | B1 | 1/2018 | Jain |
| 10,769,262 | B1 | 9/2020 | Ziraknejad |
| 2008/0133907 | A1* | 6/2008 | Parkinson ............ H04L 9/3268 713/158 |
| 2012/0023329 | A1 | 1/2012 | Yamamoto |
| 2013/0212383 | A1 | 8/2013 | Hallin et al. |
| 2013/0212639 | A1 | 8/2013 | Zhao et al. |
| 2016/0119312 | A1 | 4/2016 | Armstrong et al. |
| 2016/0352749 | A1* | 12/2016 | Baumgarte ......... G06F 16/2455 |
| 2017/0208075 | A1* | 7/2017 | Kerametlian ......... H04L 63/205 |
| 2017/0230182 | A1* | 8/2017 | Misoczki ............. H04L 9/3255 |
| 2018/0124039 | A1 | 5/2018 | Grajek |
| 2019/0303590 | A1* | 10/2019 | Hamel ................. G06Q 10/105 |
| 2020/0052905 | A1* | 2/2020 | Mathias ............... H04L 9/3265 |
| 2020/0104481 | A1* | 4/2020 | Lerch .................... G06F 21/45 |

FOREIGN PATENT DOCUMENTS

| | | |
|---|---|---|
| JP | 2012-144899 | 8/2012 |
| JP | 2018-117324 | 7/2018 |
| KR | 2012-0090148 | 8/2012 |
| WO | WO 2018/160863 | 9/2018 |

OTHER PUBLICATIONS

Extended European Search Report from European Patent Application No. 19199467.2, dated Dec. 18, 2019, 8 pages.
European Office Action from European Patent Application No. 19199467.2, dated Nov. 29, 2021, 4 pages.
Japanese Office Action from Japanese Patent Application No. 2019-175018, dated Nov. 19, 2020, 4 pages including English language translation.
Japanese Office Action from Japanese Patent Application No. 2019-175018, dated Mar. 29, 2021, 4 pages including English language translation.
Korean Office Action from Korean Patent Application No. 2019-0119051, dated Nov. 27, 2020, 17 pages including English language translation.
Korean Notice of Allowance from Korean Patent Application No. 10-2019-0119051, dated Aug. 30, 2021, 3 pages including English language translation.

* cited by examiner

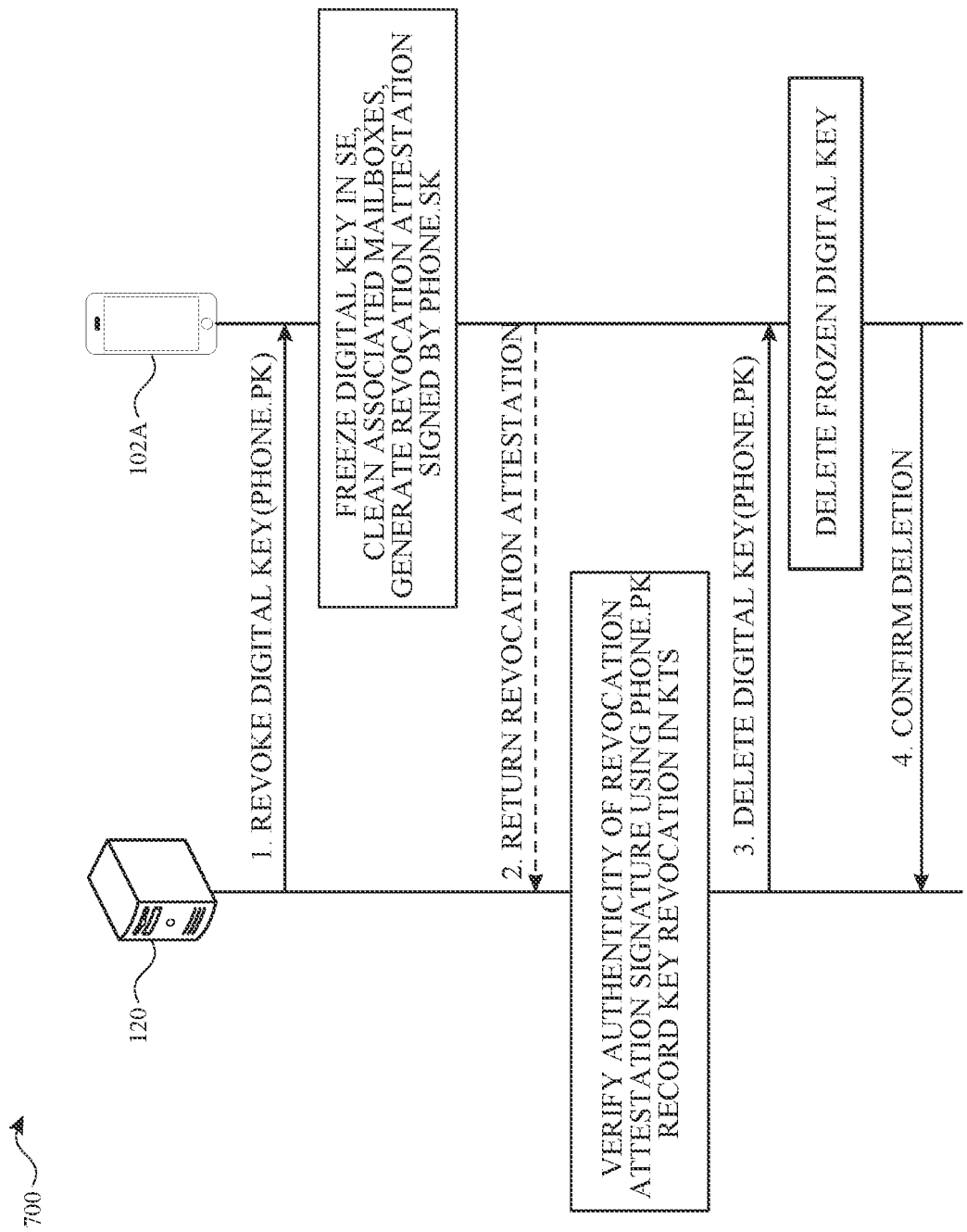

DIGITAL CREDENTIAL REVOCATION

CROSS REFERENCE TO RELATED APPLICATIONS

This application is a continuation of U.S. patent application Ser. No. 16/578,198, entitled "DIGITAL CREDENTIAL REVOCATION", filed Sep. 20, 2019, which claims the benefit of priority to U.S. Provisional Patent Application No. 62/737,820, entitled "DIGITAL CREDENTIAL REVOCATION", filed Sep. 27, 2018, the disclosure of each of which is hereby incorporated herein in its entirety.

TECHNICAL FIELD

The present description relates generally to digital credential revocation, including synchronizing revoked and valid digital credentials across devices and/or servers.

BACKGROUND

An individual user may own multiple electronic devices, such as a phone, a tablet, a watch, and a computer. If the user has associated each of the devices with their user account, there may be a trust relationship implicitly established between the different devices. Thus, the user may be able to share information across the devices with a relatively high degree of certainty that the information is being shared with a trusted device (e.g., another device associated with the same user account). However, such a trust relationship may not be implicitly established with respect to devices associated with other users' accounts.

BRIEF DESCRIPTION OF THE DRAWINGS

Certain features of the subject technology are set forth in the appended claims. However, for purpose of explanation, several embodiments of the subject technology are set forth in the following figures.

FIG. 7 illustrates an example data flow for revoking an accessor's digital credential for a secure device from the accessor's electronic device in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

As smart devices proliferate into homes and vehicles, the use of physical keys to access homes, vehicles, etc. may give way to the use of digital keys stored on electronic devices, such as watches, phones, tablets, etc. For example, a user may open a lock on a door to their house and/or car using their phone (e.g., instead of a physical key). As physical keys move towards obsolescence, so too may the traditional manner of revoking access to a home and/or vehicle from another person, e.g. asking the person to hand over their copy of the physical key for accessing the home and/or vehicle.

Since digital keys can often be copied with relative ease, and then provided to a home or vehicle as the original valid digital key (assuming the digital key has not expired), removing or deleting a digital key from an electronic device may not have the same security effect as receiving a physical copy of a key back from a person. Thus, the subject system provides various mechanisms for revoking digital keys that have been granted to another person and/or device, as well as a synchronization system that ensures that a secure device, such as a home or a vehicle, does not accept a revoked (but unexpired) digital key as the original valid digital key.

Figure 1:
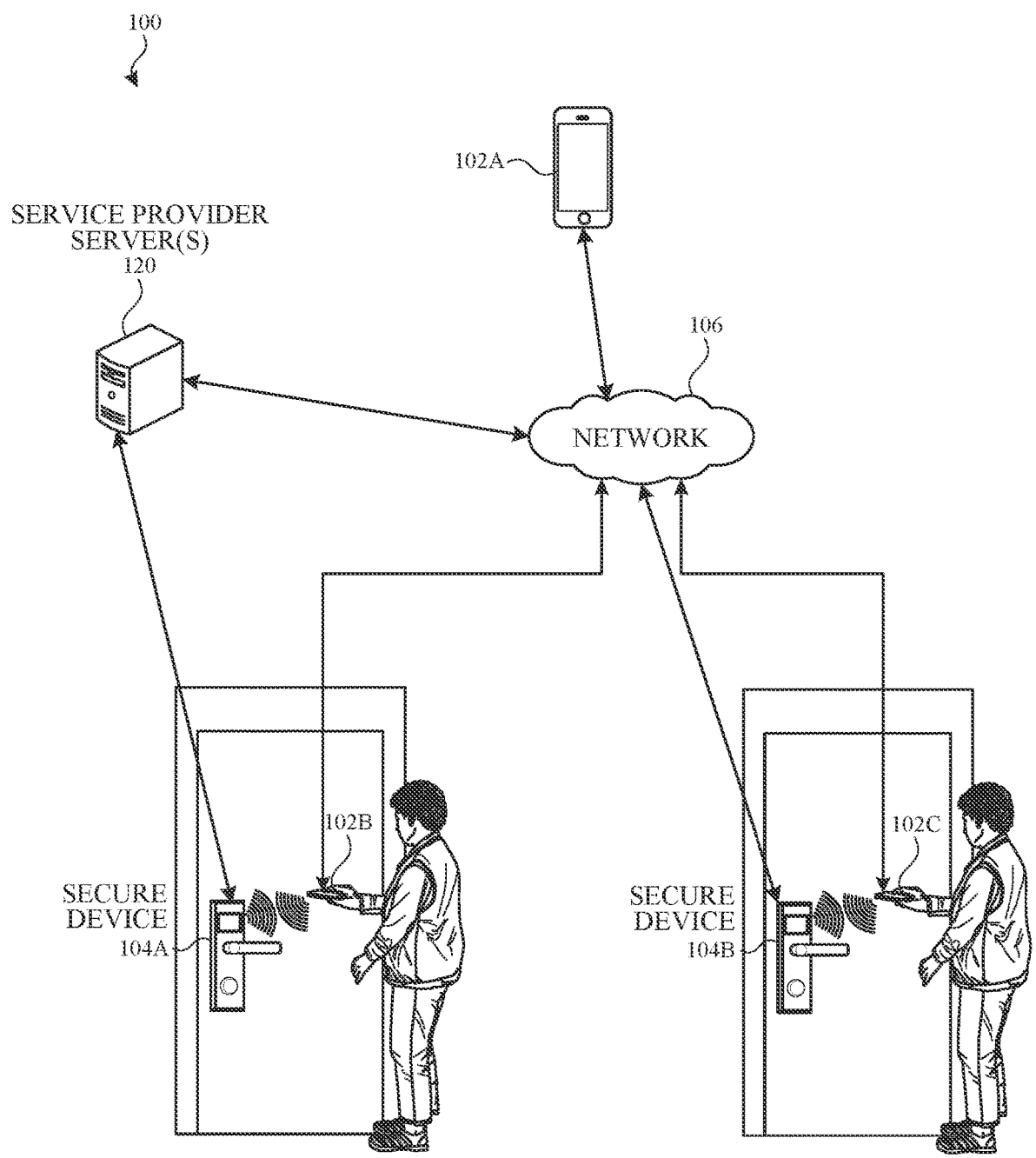
FIG. 1 illustrates an example network environment in which a digital credential revocation system may be implemented in accordance with one or more implementations.

FIG. 1 illustrates an example network environment 100 in which a digital credential revocation system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, one or more secure devices 104A-B, a network 106, and one or more service provider servers 120. The network 106 may communicatively couple, for example, one or more of the secure devices 104A-B to the one or more service provider servers 120 and/or the one or more electronic devices 102A-C, and may communicatively couple one or more of the electronic devices 102A-C to the one or more service provider servers 120 and/or the one more secure devices 104A-B.

One or more of the electronic devices 102A-C may communicate with one or more of the secure devices 104A-B via a direct communication, such as a near field communication (NFC), that bypasses the network 106. In one or more implementations, one or more of the electronic devices 102A-C may communicate with one or more of the secure devices 104A-B over the network 106 and/or one or more of the secure devices 104A-B may not be communicatively coupled to the network 106, such as the secure device 104A in FIG. 1. In one or more implementations, the network 106 may be an interconnected network of devices that may include, or may be communicatively coupled to, the Internet.

The secure devices 104A-B may be, for example, secure devices included in and/or coupled to access devices, such as doors, locks, etc., secure devices included in and/or coupled to automotive/vehicle devices, and/or any devices that include one or more wireless interfaces that may be used to grant one or more access rights, such as NFC radios, wireless local area network (WLAN) radios, Bluetooth radios, Zigbee radios, cellular radios, and/or other wireless radios. In FIG. 1, by way of example, the secure devices 104A-B are depicted as devices included in and/or coupled to an access device, such as a door lock. One or more of the secure devices 104A-B may be, and/or may include all or part of, the electronic system discussed below with respect to FIG. 13.

The one or more service provider servers 120 may include one or more servers that facilitate digital key management and/or digital key revocation with respect to one or more of the secure devices 104A-B and/or one or more of the electronic device 102A-C. For example, the one or more service provider servers 120 may include one or more trusted services manager (TSM) servers, one or more broker servers, one or more application servers, one or more business backend servers, and/or the like.

The one or more service provider servers 120 may also include one or more server devices that may be associated with one or more service providers, such as service providers corresponding to the secure devices 104A-B, and/or corresponding to respective manufacturers of the secure devices 104A-B. For example, the one or more service provider servers 120 may include one or more key tracking servers that are configured to store records of digital keys for accessing one or more of the secure devices 104A-B that are provided to the electronic devices 102A-C and/or that are shared by the electronic devices 102A-C. In one or more implementations, the one or more service provider servers 120 may be communicatively coupled to one or more of the secure devices 104A-B via a direct and/or proprietary communication link, such as a telematics communication link that bypasses all or part of the network 106.

In one or more implementations, authorized users of the electronic devices 102A-C may have respective user accounts with one or more of the service providers corresponding to the one or more service provider servers 120. The user accounts may be used to establish and/or manage devices and/or digital credentials (e.g., digital keys). The one or more service provider servers 120 may be, and/or may include all or part of, the electronic system discussed below with respect to FIG. 13.

The electronic devices 102A-C may be, for example, portable computing devices such as laptop computers, smartphones, peripheral devices (e.g., digital cameras, headphones), tablet devices, wearable devices (e.g., watches, bands, etc.), or other appropriate devices that include one or more wireless interfaces, such as one or more NFC radios, WLAN radios, Bluetooth radios, Zigbee radios, cellular radios, and/or other wireless radios. In FIG. 1, by way of example, the electronic devices 102A-C are depicted as mobile devices. One or more of the electronic devices 102A-C may be, and/or may include all or part of, the electronic device discussed below with respect to FIGS. 2 and 3, and/or the electronic system discussed below with respect to FIG. 13.

In one or more implementations, one or more of the electronic devices 102A-C, such as the electronic device 102A, may be paired with and/or associated with one or more of the secure devices 104A-B. For example, the owner (or primary authorized user) of the secure devices 104A-B may pair their electronic device, e.g. the owner electronic device 102A (or owner device), with the secure devices 104A-B. The pairing process may include the secure devices 104A-B (and/or one or more of the service provider servers 120) providing one or more private keys to the electronic device 102A that can be used by the electronic device 102A to sign access commands provided to the secure devices 104A-B. In this manner, the secure devices 104A-B can confirm that the access commands were issued by the electronic device 102A.

The electronic device 102A can also use the private keys provided by the secure devices 104A-B (and/or one or more of the service provider servers 120) to share one or more digital credentials (e.g., digital keys) with one or more of the electronic devices 102B-C, which may then be referred to as one or more accessor electronic devices 102B-C. The electronic device 102A may also be able to revoke one or more digital credentials (e.g., digital keys) that have been shared with one or more of the electronic devices 102B-C, such as prior to the expiration time associated with the digital credentials. The digital credentials may be revoked, for example, from the owner electronic device 102A, from one or more of the accessor electronic devices 102B-C, from one or more of the secure devices 104A-B, and/or from one or more of the service provider servers 120. Example data flows for revoking digital credentials are discussed further below with respect to FIGS. 7-12.

Since the digital credentials can be revoked prior to expiration from one or more of the electronic devices 102A-C and/or from one or more of the service provider servers 120, an indication of any such revocation should be propagated to the secure devices 104A-B, such as in the form of an updated valid digital credential list that does not include the revoked digital credentials (and/or corresponding identifiers). In this regard, the secure devices 104A-B may also maintain a revocation list of revoked digital credentials (and/or corresponding identifiers) in order to ensure that a revoked digital credential (or copy thereof) is not used to access the secure devices 104A-B. However, since the digital credentials can be revoked prior to their expiration time, the secure devices 104A-B may not be able to differentiate between a valid digital credential and a digital credential that has been revoked prior to its expiration time. Thus, if the electronic device 102A keeps a copy of a digital credential (after the digital credential has been revoked but before the digital credential's expiration time), the electronic device 102A may be able to use the digital credential to improperly access one or more of the secure devices 104A-B.

Thus, the subject system implements a synchronization counter value that is separately maintained by the owner electronic device 102A and the corresponding secure devices 104A-B. The synchronization counter value is incremented each time that the secure devices 104A-B synchronize with the owner electronic device 102A (e.g., and receive updated valid digital credential lists). The owner electronic device 102A may then provide the synchronization counter value in conjunction with any newly shared (or issued) digital credentials, which may then be provided to the secure devices 104A-B when the digital credentials are first presented to the secure devices 104A-B. The secure devices 104A-B may compare the received synchronization counter value to their local synchronization counter value and determine, based at least in part on the comparison, whether to accept the digital credential. In this manner, digital credentials that were issued prior to the most recent synchronization will have a lower synchronization counter value (e.g. than the local synchronization counter value) and therefore will not be accepted.

An example process of a secure device in the subject system is discussed further below with respect to FIG. 4, and an example process of an owner electronic device 102A in the subject system is discussed further below with respect to FIG. 5. Example synchronization counter values at different states of the subject system are discussed further below with respect to FIG. 6.

Figure 2:
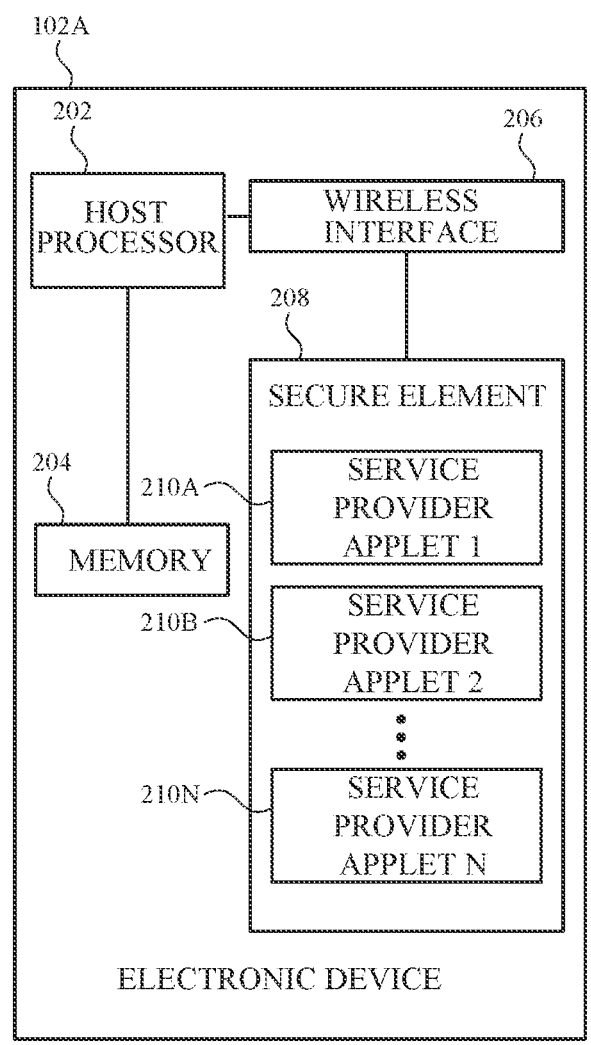
FIG. 2 illustrates an example electronic device that may be used in a digital credential revocation system in accordance with one or more implementations.

FIG. 2 illustrates an example electronic device 102A that may be used in a digital credential revocation system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more of the electronic devices 102B-C and/or the secure devices 104A-B.

The electronic device 102A may include a host processor 202, a memory 204, a wireless interface 206, and a secure element 208. For explanatory purposes, the electronic device 102A is depicted as including a secure element 208; the electronic device 102A, may include a secure enclave processor in lieu of, or in addition to, the secure element 208.

The secure element 208 may include one or more interfaces for communicatively coupling (directly or indirectly) to the wireless interface 206 and/or the host processor 202, such as via one or more single wire protocol (SWP) connections and/or any other data connection. The secure element 208 may include one or more service provider applets 210A-N, which may be referred to herein as applets 210A-N. In one or more implementations, the operating system and/or execution environment of the secure element 208 may be a JAVA-based operating system and/or JAVA-based execution environment, and the applets 210A-N may be JAVA-based applets. In other implementations, other operating systems, languages, and/or environments can be implemented. In addition to the one or more applets 210A-N, the secure element 208 may also include one or more additional applets for performing other operations, such as a security applet, a registry applet, and the like.

The applets 210A-N may be provisioned on the secure element 208 in part by one or more of the service provider servers 120, such as a trusted services manager server and/or a broker server. For example, the trusted services manager server and/or the broker server may transmit a provisioning script to the electronic device 102A via the network 106. In some implementations, the host processor 202 of the electronic device 102A may receive the script and may provide the script to the secure element 208, such as via the wireless interface 206 and/or directly to the secure element 208. The secure element 208 may perform one or more security mechanisms to verify the received script, such as one or more security mechanisms inherent in the GlobalPlatform framework, and may then execute the received script. The execution of the script by the secure element 208 may cause one or more of the applets 210A-N to be provisioned on the secure element 208.

In one or more implementations, one or more of the applets 210A-N may correspond to a service provider associated with one or more of the secure devices 104A-B. For example, the applet 210A may correspond to a service provider associated with the secure device 104A, such as a manufacturer of a door lock or vehicle. In this instance, the synchronization counters, valid digital credential lists, private keys, public keys, and/or attestation data items associated with the secure device 104A may be stored on the secure element 208 in conjunction with the applet 210A. In addition, the secure device 104A may include a secure element that stores a secure device synchronization counter, a secure device valid digital credential list, a secure device revocation list, and/or a secure device last synchronization time.

The wireless interface 206 may include one or more antennas and one or more transceivers for transmitting/receiving wireless communications. The wireless interface 206 may further include one or more interfaces, such as a single wire protocol interface, for coupling to the host processor 202 and/or the secure element 208.

In one or more implementations, the wireless interface 206 may be an NFC controller that is able to communicate via one or more different NFC communication protocols, such as NFC-A (or Type A), NFC-B (or Type B), NFC-F (or Type F or FeliCA), and/or International Organization for Standardization (ISO)/International Electrotechnical Commission (IEC) 15693. The NFC-A protocol may be based on ISO/IEC 14443A and, e.g., may use Miller bit coding with a 100 percent amplitude modulation. The NFC-B protocol may be based on ISO/IEC 14443B and, e.g., may use variations of Manchester encoding along with a 10 percent modulation. The NFC-F protocol may be based on FeliCA JIS X6319-4 and, e.g., may use a slightly different variation of Manchester coding than the NFC-B protocol.

One or more of the secure devices 104A-B may include similar wireless communication capabilities as the electronic device 102A. For example, the secure device 104A may include one or more antennas and/or transceivers for communicating with one or more of the electronic devices 102A-B via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, one or more of the secure devices 104A-B may include a wireless reader, such as an NFC reader.

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the wireless interface 206, the secure element 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
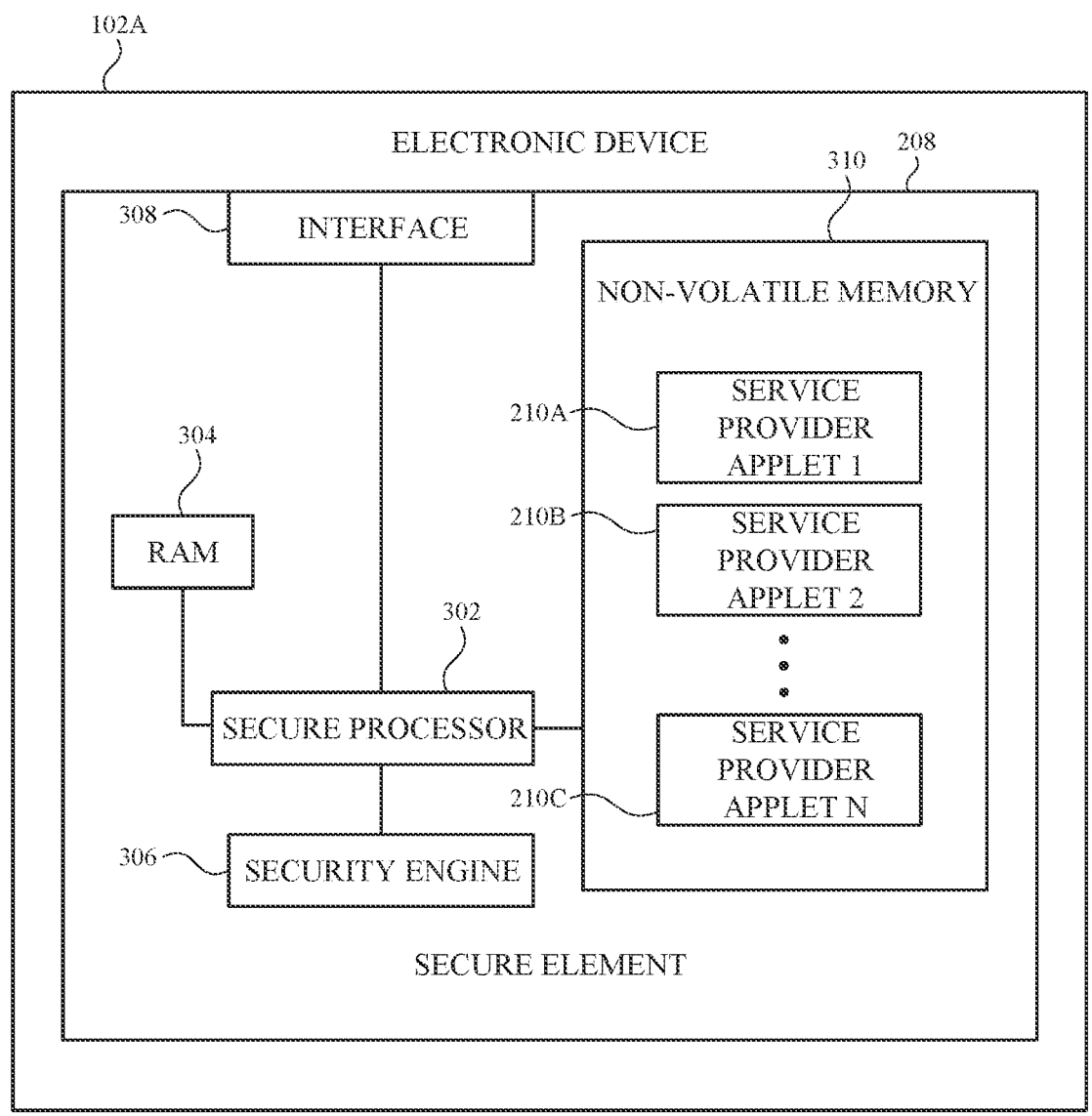
FIG. 3 illustrates an example electronic device including an example secure element that may be used in a digital credential revocation system in accordance with one or more implementations.

FIG. 3 illustrates an example electronic device 102A including an example secure element 208 that may be used in a digital credential revocation system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. For explanatory purposes, the secure element 208 is illustrated as being implemented in the electronic device 102A; however, the secure element 208 may be implemented on any other electronic device.

The secure element 208 may include, among other components, a secure processor 302, RAM 304, a security engine 306, an interface 308, and non-volatile memory 310. The RAM 304 may include one or more of static RAM (SRAM) and/or dynamic RAM (DRAM). The interface 308 may communicatively couple the security element 208 to one or more other chips in the device, such as the wireless interface 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. In one or more implementations, the communications between the secure element 208 and an external device, such as the secure device 104A may be encrypted. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the executable code associated with the applets 210A-N, such as synchronization counters, valid digital credential lists, revocation credential lists, private keys, public keys, and/or attestation data items associated with the secure devices 104A-B, and/or for sharing access to the secure devices 104A-B. In one or more implementations, the non-volatile memory 310 may also store firmware and/or operating system executable code that is executed by the secure processor 302 to provide the execution environment for the applets 210A-N, such as a JAVA execution environment. In one or more implementations, the non-volatile memory 310 and/or the RAM 304 may be considered a secure memory region and/or secure domain of the electronic device 102A and/or a secure memory region and/or secure domain of the secure element 208.

In one or more implementations, one or more of the secure processor 302, the RAM 304, the security engine 306, the interface 308, the non-volatile memory 310, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
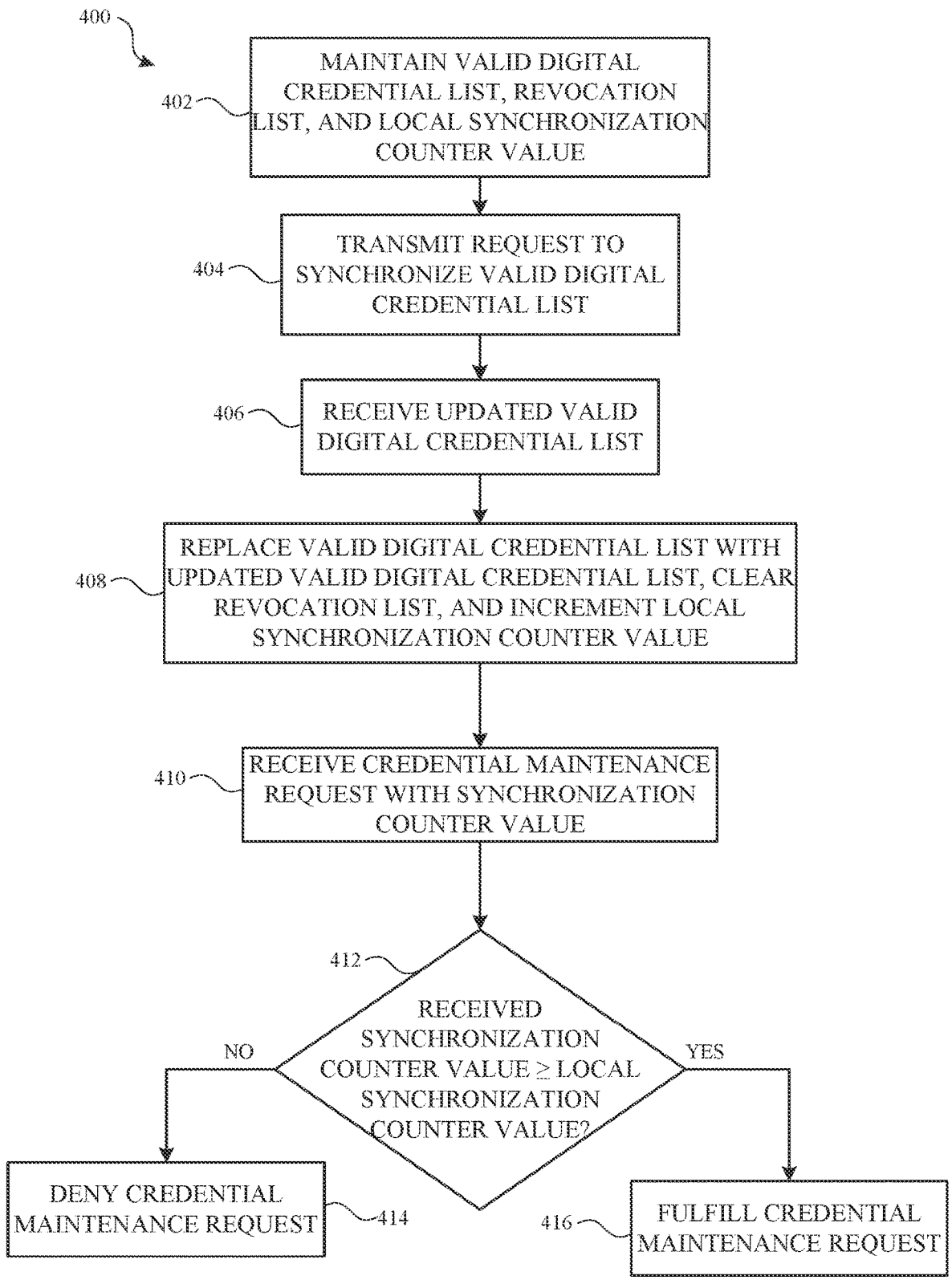
FIG. 4 illustrates a flow diagram of an example process of a secure device in a digital credential revocation system in accordance with one or more implementations.

FIG. 4 illustrates a flow diagram of an example process 400 of a secure device 104A in a digital credential revocation system in accordance with one or more implementations. For explanatory purposes, the process 400 is primarily described herein with reference to the secure device 104A of FIG. 1. However, the secure device 104A is presented as an exemplary device and the operations described herein may be performed by any suitable device. For example, the process 400 may be performed by the secure device 104B, or generally any electronic device. Further for explanatory purposes, the operations of the process 400 are described herein as occurring in serial, or linearly. However, multiple operations of the process 400 may occur in parallel. In addition, the operations of the process 400 need not be performed in the order shown and/or one or more of the operations of the process 400 need not be performed and/or can be replaced by other operations.

In the subject system, the secure device 104A maintains a valid digital credential list, which may be referred to as a secure device valid digital credential list, a revocation list, which may be referred to as a secure device revocation list, and a local synchronization counter value, which may also be referred to as a secure device synchronization counter value (402). The valid digital credential list includes the digital credentials, e.g. digital keys, (and/or corresponding identifiers) that are valid for accessing the secure device 104A, along with one or more entitlements (e.g., one or more access rights) assigned to the digital credentials, and any expiration times associated with the digital credentials. The revocation list includes identifiers of digital credentials, e.g. digital keys, that have been revoked, e.g. via a user interface of the secure device 104A, as well as any respective expiration times associated with the digital credentials. In one or more implementations, one or more of the digital credentials can only be registered a single time and therefore would do not have any expiration times; thus, if any such digital credential were deleted and/or revoked, a new digital credential would need to be issued. The synchronization counter value is a counter value that is incremented each time that the secure device 104A synchronizes with the electronic device of the owner (or primary authorized user) of the secure device 104A, such as the electronic device 102A.

Thus, when the secure device 104A receives, e.g. from the electronic device 102B, a digital credential that is contained in the valid digital credential list, has not expired, and for which an identifier is not stored in the revocation list, the secure device 104A allows access in accordance with the one or more entitlements assigned to the digital credential. However, when the secure device 104A receives, e.g. from the electronic device 102B, a digital credential that is not contained in the valid digital credential list, has expired, or for which an identifier is stored in the revocation list, the electronic device 102B does not allow access. In addition, when a digital credential stored in the valid digital credential list is revoked, the digital credential is migrated to the revocation list. In one or more implementations, when a digital credential stored in either list expires, the digital credential is removed from the list. Example valid digital credential and revocation lists, and example synchronization counter values are discussed further below with respect to FIGS. 6A-6C.

The secure device 104A transmits a request to synchronize its valid digital credential list with the electronic device 102A of the corresponding owner (or primary authorized user) of the secure device 104A (404). The synchronization request may include the valid digital credential list and the revocation list of the secure device 104A. The secure device 104A may initiate the synchronization request when a digital credential is revoked via the secure device 104A, such as via a user interface of the secure device 104A. In one or more implementations, the synchronization may be initiated by the electronic device 102A, and/or the service provider server 120, such as when a digital credential is revoked via the electronic device 102A and/or the service provider server 120.

In one or more implementations, the synchronization request may be directly (e.g., via NFC, Bluetooth, etc.), or indirectly transmitted to the electronic device 102A of the owner (or primary authorized user) and/or the request may be transmitted to the service provider server 120, which may process the request and/or forward the request to the electronic device 102A of the owner (or primary authorized user).

Responsive to transmitting the request (404), the secure device 104A receives an updated valid digital credential list (406), that lists the digital credentials that are valid at the electronic device 102A and/or at the service provider server 120. The secure device 104A replaces its valid digital credential list with the received updated valid digital credential list, clears its revocation list, and increments its local synchronization counter value (408). In one or more implementations, the secure device 104A may perform the updating, clearing, and incrementing (408) in a single atomic transaction, such that the entire transaction is rolled back if each of the updating, clearing, and incrementing is not successfully completed.

The secure device 104A may receive a credential maintenance request that includes a synchronization counter value (410). The credential maintenance request may be, for example, a request to add a digital credential to the valid digital credential list, and/or a request to revoke a digital credential, e.g., remove a digital credential from the valid digital credential list and add an identifier of the digital credential to the revocation list. For example, the owner (or primary authorized user) of the secure device 104A may use their electronic device 102A to share a digital credential with the electronic device 102B another user, who may then be referred to as an accessor of the secure device 104A. The digital credential may be provided to the electronic device 102B along with the current synchronization counter value at the electronic device 102A of the owner. The accessor may use their electronic device 102B to present the digital key and synchronization counter value to the secure device 104A in order to access the secure device 104A.

The secure device 104A determines whether the received synchronization counter value is greater than or equal to the local synchronization counter value at the secure device 104A (412). If the received synchronization counter value is less than the local synchronization counter value (meaning that the received digital credential was issued prior to the most recent synchronization), the secure device 104A denies the credential maintenance request and does not perform the request (414). If the received synchronization counter value is greater than or equal to the local synchronization counter value (meaning that the received digital credential was issued after the most recent synchronization), the secure device 104A fulfills the credential maintenance request by either adding or revoking the digital credential (416).

In one or more implementations, when the digital credentials issued for a given secure device 104A are generally set to expire within a relatively short period of time, such as an hour, a day, a week, a month, or a year, a synchronization counter value may not be used, provided that the secure device 104A has sufficient memory to store the credential lists. In this instance, the digital credentials could be removed from the revocation list as they expire. However, if the digital credentials are typically issued with longer lifetimes, the synchronization counter value can be used to block the revoked credentials. In one or more implementations, the synchronization counter value may not roll over but may block at its highest value. Thus, when the synchronization counter value reaches its highest value, no additional digital credentials may be issued for the secure device 104A, as the revocation may then only managed by the revocation list which can no longer be cleared.

Figure 5:
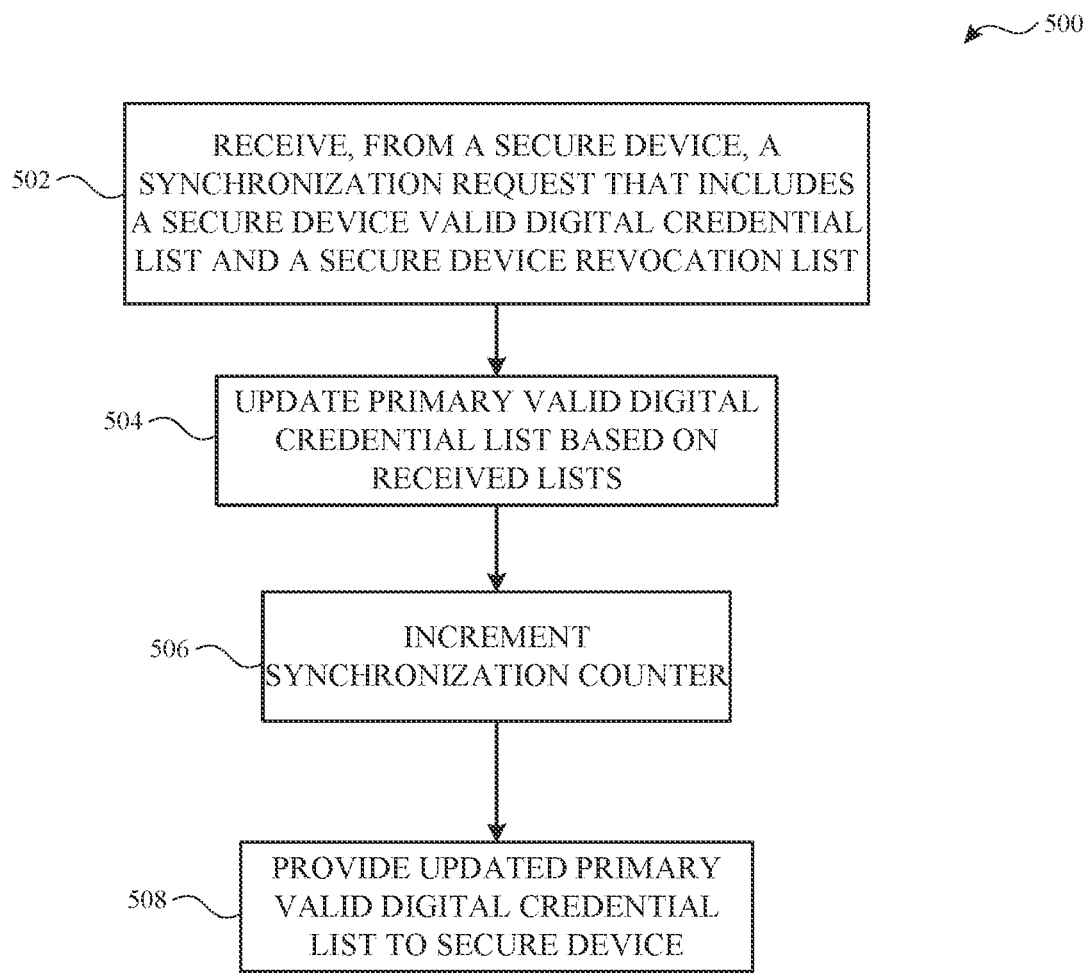
FIG. 5 illustrates a flow diagram of an example process of an electronic device in a digital credential revocation system in accordance with one or more implementations.

FIG. 5 illustrates a flow diagram of an example process 500 of an electronic device 102A in a digital credential revocation system in accordance with one or more implementations. For explanatory purposes, the process 500 is primarily described herein with reference to the electronic device 102A of FIGS. 1-3. However, the electronic device 102A is presented as an exemplary device and the operations described herein may be performed by any suitable device. For example, the process 500 may be performed by one or more of the electronic devices 102B-C, or generally any electronic device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The process 500 begins when the electronic device 102A of an owner (or primary authorized user) of the secure device 104A receives a synchronization request from the secure device 104A that includes a secure device valid credential list and a secure device revocation list (502). In one or more implementations, the synchronization may be initiated by the electronic device 102A, in which case the electronic device 102A may receive the secure device valid digital credential list and the secure device revocation list responsive to a request therefor.

The electronic device 102A updates its primary valid digital credential list based on the received lists (504). For example, the electronic device 102A may maintain a primary valid digital credential list that includes identifiers of the digital credentials that have been shared by the electronic device 102A and are presently valid. Thus, when the electronic device 102A receives the revocation list from the secure device 104A, the electronic device 102A removes (from the primary valid digital credential list), the identifiers of any digital credentials that are included in the secure device revocation list, and the electronic device 102A adds identifiers of any digital credentials included in the secure device valid digital credential list that are not included in the primary valid digital credential list (and therefore have not been revoked).

In one or more implementations, when the synchronization is performed the electronic device 102A may also receive a valid digital credential list and/or a revocation list from one or more other sources from which digital credentials can be issued and/or revoked, such as the service provider server 120. In this instance, the electronic device 102A may process the lists received from the different sources in a similar manner to which the lists received from the secure device 104A are processed. The electronic device 102A increments its synchronization counter value (506), and provides the updated primary valid digital credential list is provided to the secure device 104A (508).

Figure 6A:
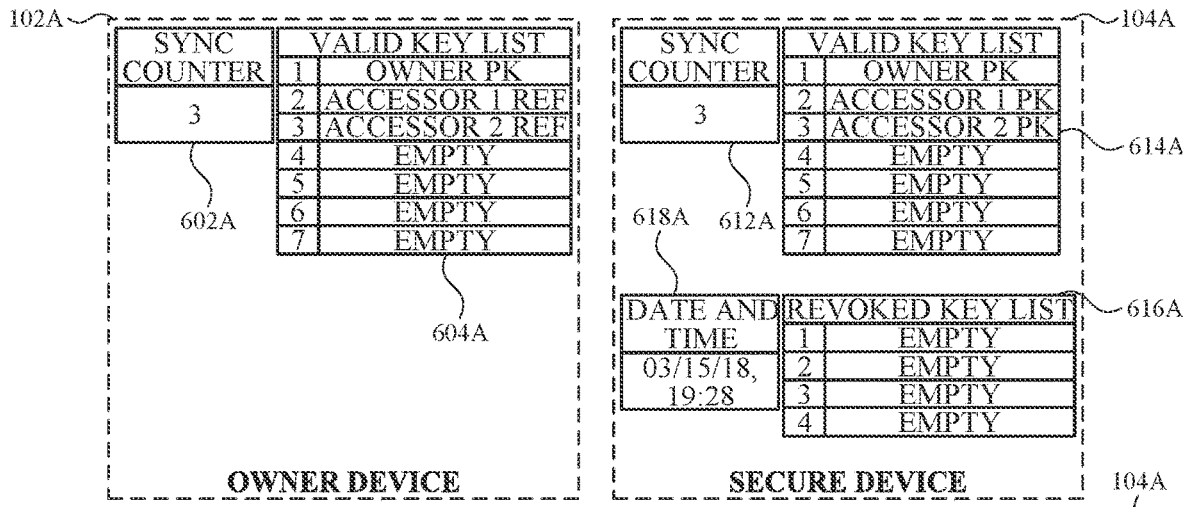
FIGS. 6A-6C illustrates example data values in a secure device and in an electronic device at different states of a digital credential revocation system in accordance with one or more implementations.
Figure 6B:
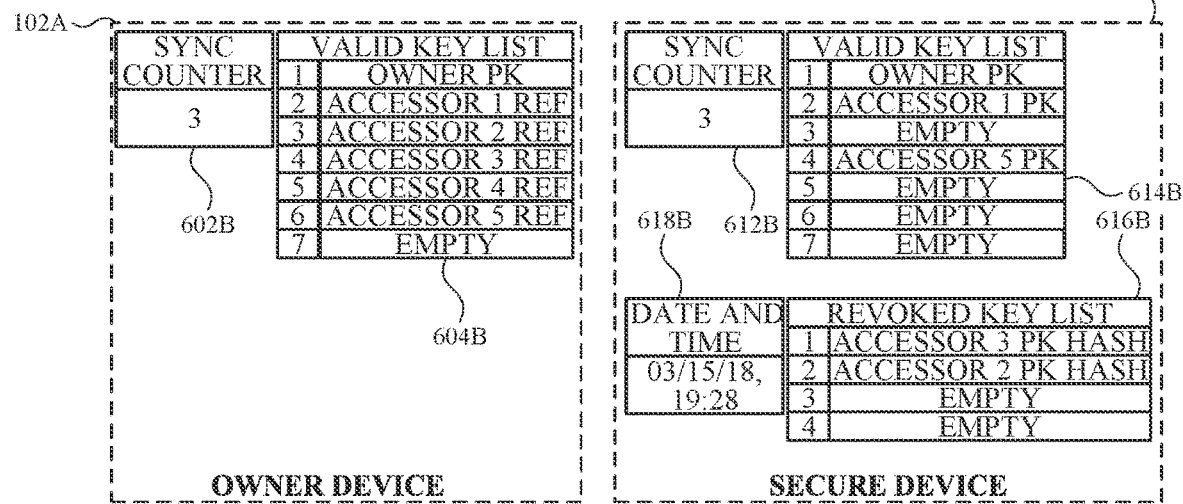
Figure 6C:
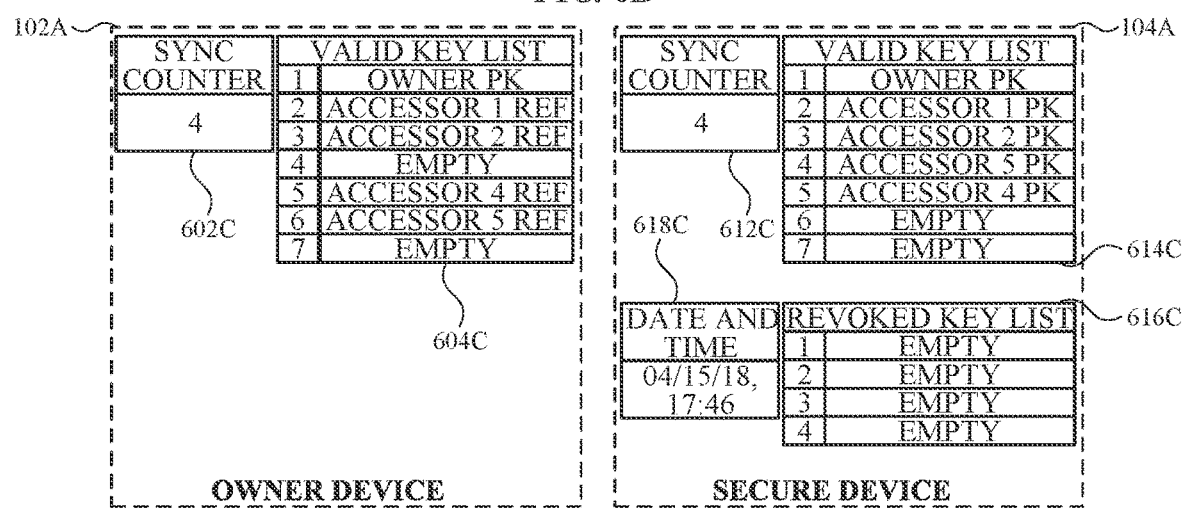

FIGS. 6A-6C illustrates example data values in a secure device and in an electronic device at different states of a digital credential revocation system in accordance with one or more implementations. Not all of the depicted values may be used in all implementations, however, and one or more implementations may include additional or different values than those shown in the figures. Additional values, different values, or fewer values may be provided.

FIGS. 6A-6C include a secure device 104A and the electronic device 102A of the owner (or primary authorized user) of the secure device 104A. The electronic device 102A stores a synchronization counter value 602A-C, and a valid key list 604A (which may be referred to as a primary valid digital credential list). The secure device 104A stores a synchronization counter value 612A-C (which may be referred to as a secure device synchronization counter value), a valid key list 614A-C (which may be referred to as a secure device valid digital credential list), a revoked key list 616A-C (which may be referred to as a secure device revocation list), and a last synchronized date/time 618A-C. As shown in FIGS. 6A-6C, the revoked key lists 616A-C store hashes of the revoked digital keys, which may reduce the amount of memory required to store the revoked key lists 616A-C. In addition, the secure device 104A may frequently synchronize with the electronic device 102A, such as via NFC or Bluetooth, to keep the revoked key lists 616A-C small.

In FIG. 6A, the valid key list 604A and synchronization counter value 602A of the electronic device 102A match the valid key list 614A and the synchronization counter value 612A of the secure device 104A, and the revoked key list 616A of the secure device 104A is empty. Thus, FIG. 6A may, for example, represent a state immediately after a synchronization has occurred.

In FIG. 6B, the synchronization counter value 602A of the electronic device 102A matches the synchronization counter value 612A of the secure device 104A. However, additional digital credentials have been added to the valid key list 604B of the electronic device 102A as well as the valid key list 614B of the secure device 104A. In addition, multiple digital credentials have been revoked from the secure device 104A. Thus, FIG. 6B may represent a state where a synchronization should be triggered, e.g. by the secure device 104A, the electronic device 102A, and/or the service provider server 120.

In FIG. 6C, the valid key list 604A and synchronization counter value 602A of the electronic device 102A match the valid key list 614A and the synchronization counter value 612A of the secure device 104A, and the revoked key list 616A of the secure device 104A is empty. Thus, FIG. 6C represents a state after synchronization has occurred and the synchronization counter values 602C, 612C have been incremented. As shown in FIG. 6C, the digital keys corresponding to accessors 2 and 3 (which were revoked on the secure device 104A as shown in the revoked key list 616B of FIG. 6B), are removed from the valid key list 604C of the electronic device 102A, which is then provided to the secure device 104A during the synchronization and used as the valid key list 614C.

FIG. 7 illustrates an example data flow 700 for revoking an accessor's digital credential for a secure device from the accessor's electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 700 includes the service provider server 120, and an electronic device 102A from which a digital key is being revoked. In the data flow 700, the service provider server 120 transmits a revoke digital key command to the electronic device 102A that includes the digital key that is being revoked. The electronic device 102A freezes the digital key in the secure element 208, such as by marking the digital key as revoked and thereby placing the digital key in state in which it cannot be used. The corresponding applet 210A on the secure element 208 of the electronic device 102A clears the associated mailboxes (e.g., private and public), and the electronic device 102A requests that the secure element 208 provide a revocation attestation which attests that the key has been frozen/revoked. In one or more implementations, the revocation attestation may be signed once using the revoked key and/or a private key corresponding to the revoked key.

The electronic device 102A transmits the revocation attestation to the service provider server 120. The service provider server 120 verifies the authenticity of the revocation attestation signature, such as by using the revoked key, and the service provider server 120 records the key revocation, such as in a key tracking server (KTS). The service provider server 120 then transmits a command to delete the digital key to the electronic device 102A. The electronic device 102A receives the command, deletes the digital key from the secure element 208, and transmits a deletion confirmation to the service provider server 120.

Figure 8:
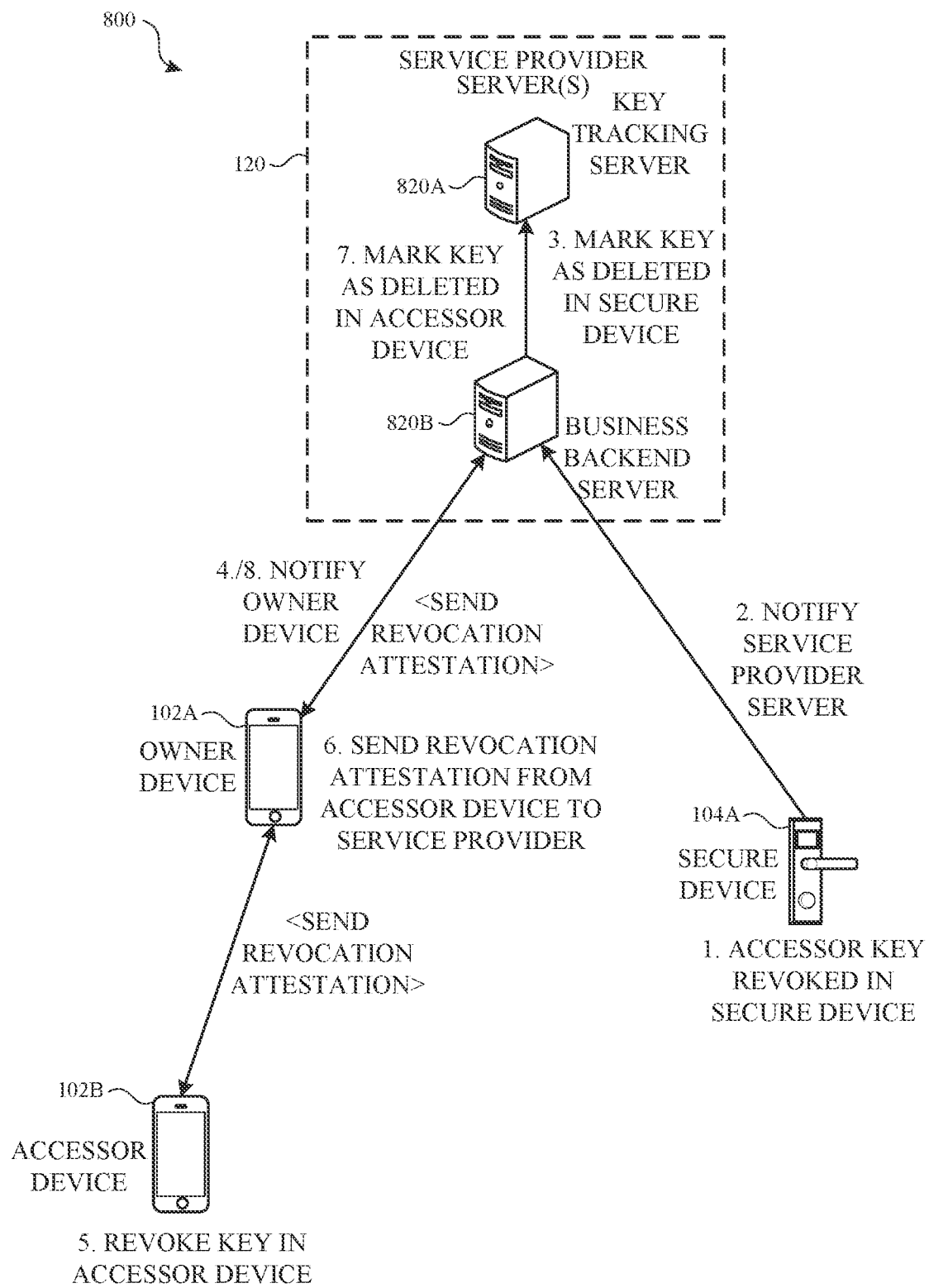
FIG. 8 illustrates an example data flow for revoking an accessor's digital credential for a secure device from the secure device in accordance with one or more implementations.

FIG. 8 illustrates an example data flow 800 for revoking an accessor's digital credential for a secure device from the secure device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 800 includes the electronic devices 102A-B, the secure device 104A, and the one or more service provider servers 120, which include a key tracking server 820A and a business backend server 820B. In the data flow 800, the digital credential of an accessor is revoked from the secure device 104A. For example, the owner and/or primary authorized user of the secure device 104A may revoke the digital key of the accessor through a user interface of the secure device 104A, which removes the digital key from the secure device 104A. In one or more implementations, when the digital key implements a safety-fade-out policy, where the digital key is not deleted immediately but has its usability downgraded over time in multiple steps, the fade-out policy is completed before the digital key is removed from the secure device 104A.

The secure device 104A notifies the one or more service provider servers 120 that the digital key has been revoked. For example, the secure device 104A may notify the one or more service provider servers 120 via a cellular data connection, a proprietary link (e.g. a telematics link), and/or by communicatively coupling to an electronic device, such as the electronic device 102A, and utilizing a network connection of the electronic device. The business backend server 820B receives the notification and transmits a command to the key tracking server 820A to mark the digital key as deleted in the secure device 104A. The business backend server 820B notifies the electronic device 102A of the owner, which removes the digital key from its user interface and sends a revocation attestation request to the electronic device 102B of the accessor (e.g., in the manner described above in FIG. 7).

The electronic device 102B of the accessor freezes and revokes the digital key (e.g., in the manner described above in FIG. 7) and sends the revocation attestation to the electronic device 102A of the owner. The electronic device 102A of the owner forwards the revocation attestation to the business backend server 820B, which sends a command to the key tracking server 820A to mark the digital key as deleted in the electronic device 102B of the accessor. The business backend server 820B then notifies the electronic device 102A of the owner when the digital key has been marked (in the key tracking server 820A) as deleted from the electronic device 102B. The electronic device 102A then sends a deletion command to the electronic device 102B to delete the frozen digital key from its secure element.

Figure 9:
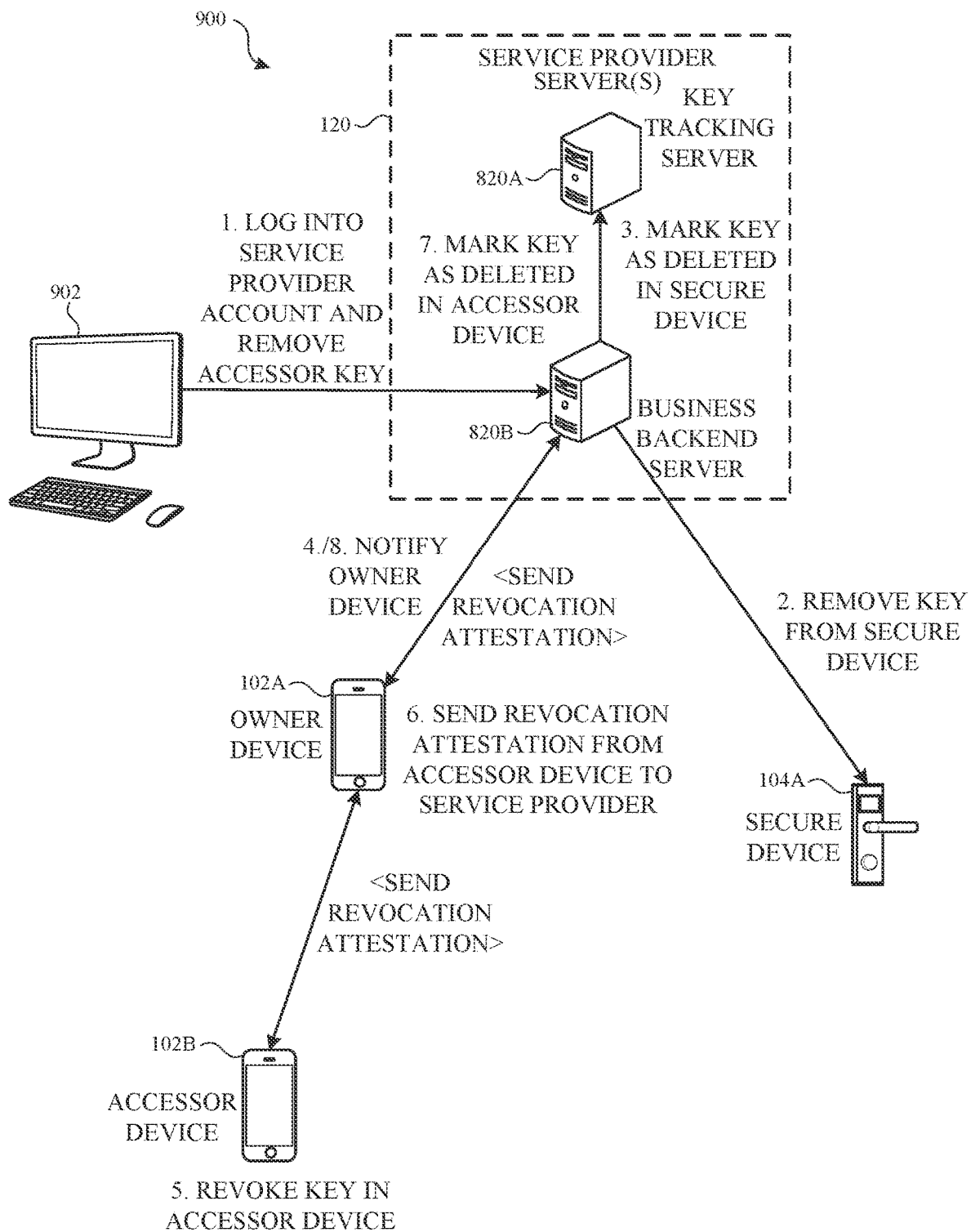
FIG. 9 illustrates an example data flow for revoking an accessor's digital credential for a secure device from a service provider server associated with the secure device in accordance with one or more implementations.

FIG. 9 illustrates an example data flow 900 for revoking an accessor's digital credential for a secure device from a service provider server associated with the secure device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 900 includes a computing device 902, the electronic devices 102A-B, the secure device 104A, and the one or more service provider servers 120, which include a key tracking server 820A and a business backend server 820B. In the data flow 900, the owner or primary authorized user of the secure device 104A uses the computing device 902 to log into an account with the service provider and remove a digital key of a particular accessor, such as by using a web browser. The business backend server 820B transmits a command to remove the digital key to the secure device 104A, such as via a cellular connection, a proprietary link (e.g. a telematics link), or by communicatively coupling through a network connected device. The remaining steps of the data flow 900 are described above with respect to the data flow 800.

Figure 10:
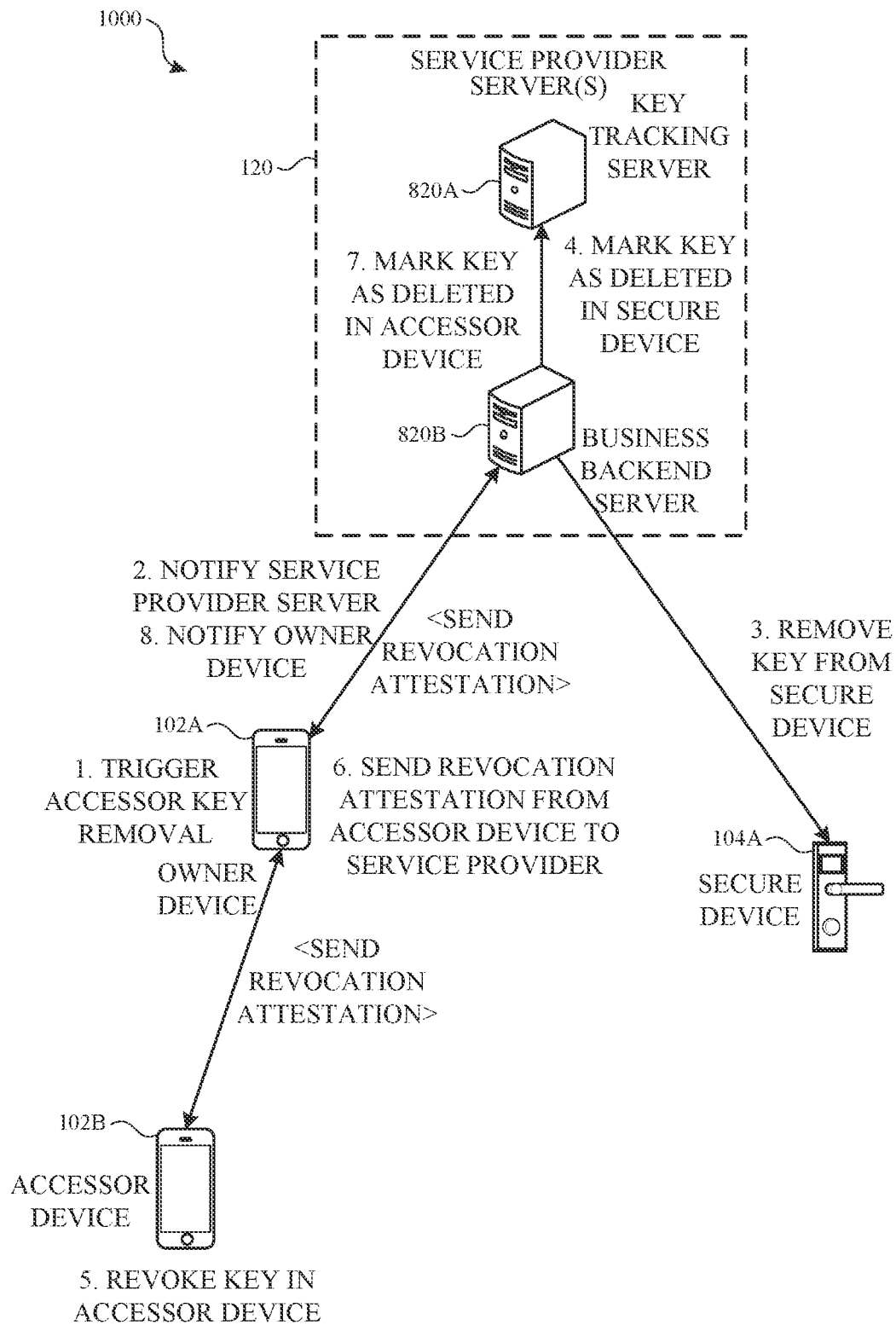
FIG. 10 illustrates an example data flow for revoking an accessor's digital credential for a secure device from an electronic device associated with the secure device in accordance with one or more implementations.

FIG. 10 illustrates an example data flow 1000 for revoking an accessor's digital credential for a secure device from an electronic device associated with the secure device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 1000 includes the electronic devices 102A-B, the secure device 104A, and the one or more service provider servers 120, which include a key tracking server 820A and a business backend server 820B. In the data flow 1000, the owner or primary authorized user of the secure device 104A uses the electronic device 102A to trigger a removal of a digital key in an accessor's electronic device 102B. The electronic device 102A notifies the business backend server 820B of the key deletion request, and the remaining steps of the data flow 1000 are described above with respect to the data flow 800.

Figure 11:
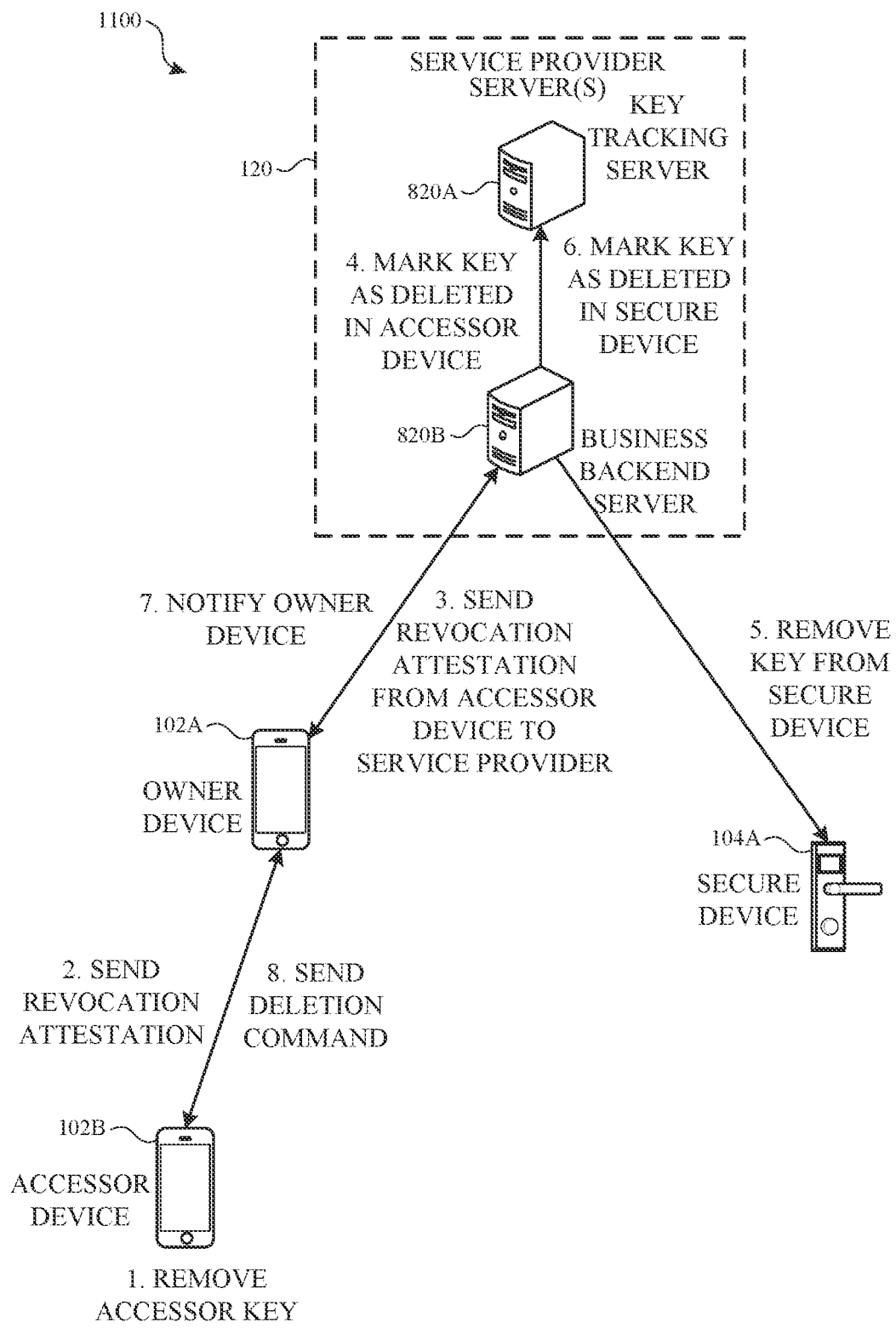
FIG. 11 illustrates an example data flow for revoking an accessor's digital credential for a secure device from the accessor's electronic device without a fade-out period in accordance with one or more implementations.

FIG. 11 illustrates an example data flow 1100 for revoking an accessor's digital credential for a secure device from the accessor's electronic device without a fade-out period in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 1100 includes the electronic devices 102A-B, the secure device 104A, and the one or more service provider servers 120, which include a key tracking server 820A and a business backend server 820B. In the data flow 1100, the digital credential of an accessor of the secure device 104A is revoked from the electronic device 102B of the accessor. For example, the accessor may revoke the digital key using a user interface of the electronic device 102B. The electronic device 102B freezes and revokes the digital key and sends a revocation attestation to the electronic device 102A of the owner (or primary authorized user) of the secure device 104A.

The electronic device 102A of the owner forwards the revocation attestation to the business backend server 820B, which sends a command to the key tracking server 820A to mark the digital key as deleted in the electronic device 102B of the accessor. The business backend server 820B also transmits a command to remove the digital key from the secure device 104A and transmits a command to the key tracking server to mark the digital key as deleted from the secure device 104A. The business backend server 820B notifies the electronic device 102A of the owner when the digital key has been marked as deleted from the electronic device 102B in the key tracking server 820A. The electronic device 102A sends a deletion command to the electronic device 102B to instruct the electronic device 102B to delete the frozen digital key from its secure element. The electronic device 102B of the accessor may alert the accessor before deleting the digital key since the process may not be reversible.

Figure 12:
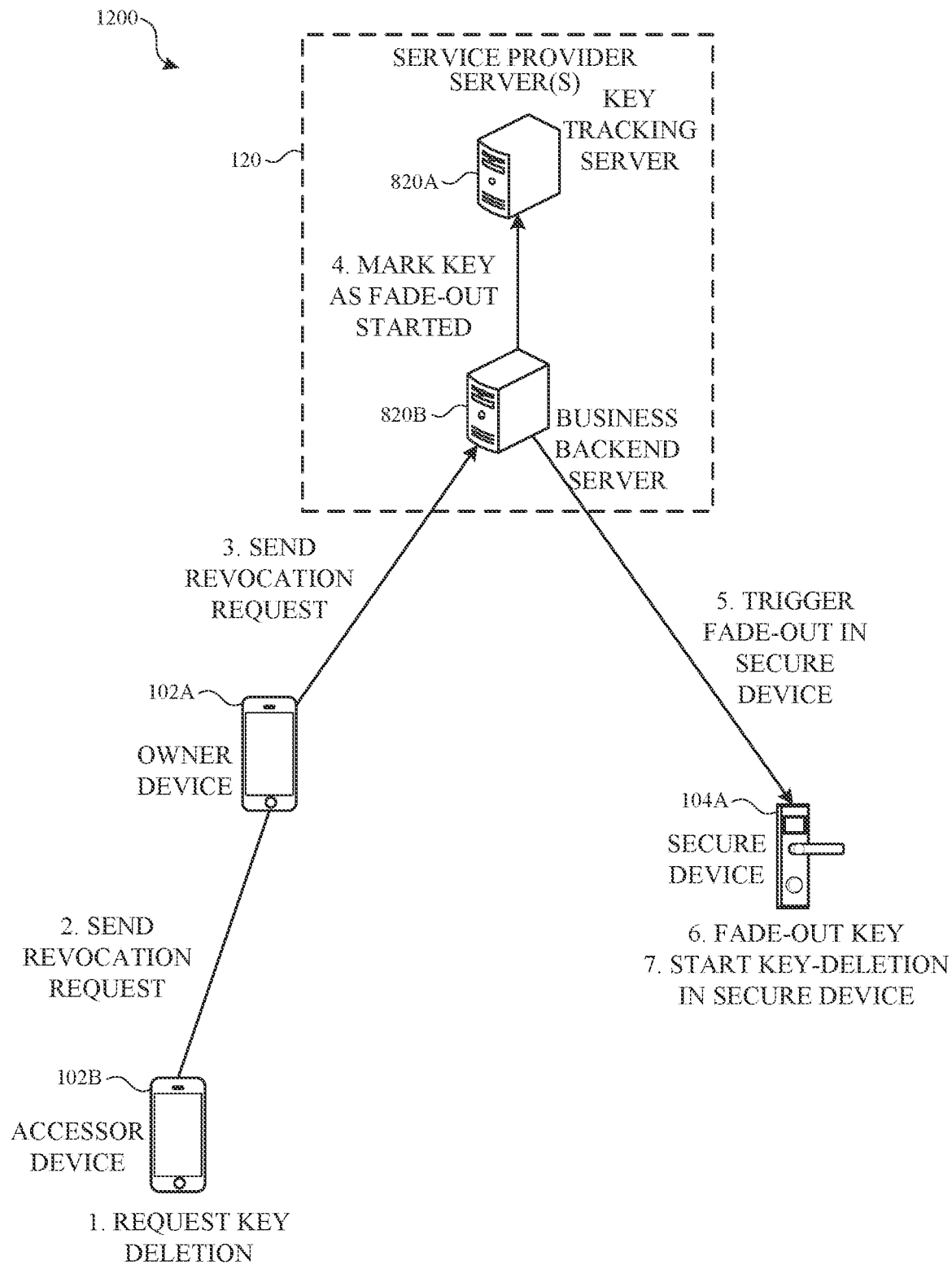
FIG. 12 illustrates an example data flow for revoking an accessor's digital credential for a secure device from the accessor's electronic device with a fade-out period in accordance with one or more implementations.

FIG. 12 illustrates an example data flow 1200 for revoking an accessor's digital credential for a secure device from the accessor's electronic device with a fade-out period in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 1200 includes the electronic devices 102A-B, the secure device 104A, and the one or more service provider servers 120, which include a key tracking server 820A and a business backend server 820B. In the data flow 1200, the digital credential of an accessor of the secure device 104A is requested to be deleted from the electronic device 102B of the accessor with a fade-out policy implemented. For example, the accessor may revoke the digital key using a user interface of the electronic device 102B. The electronic device 102B transmits a revocation request to the electronic device 102A of the owner of the secure device 104A, and the electronic device 102A transmits the revocation request to the business backend server 820B. The business backend server 820B transmits a command to the key tracking server 820A to mark the digital key as fade-out started. The business backend server 820B also transmits a command to the secure device 104A to begin the fade-out process. The secure device 104A completes the fade-out process, then starts the process or deleting the key from the secure device 104A as is discussed above with respect to FIG. 8.

Figure 13:
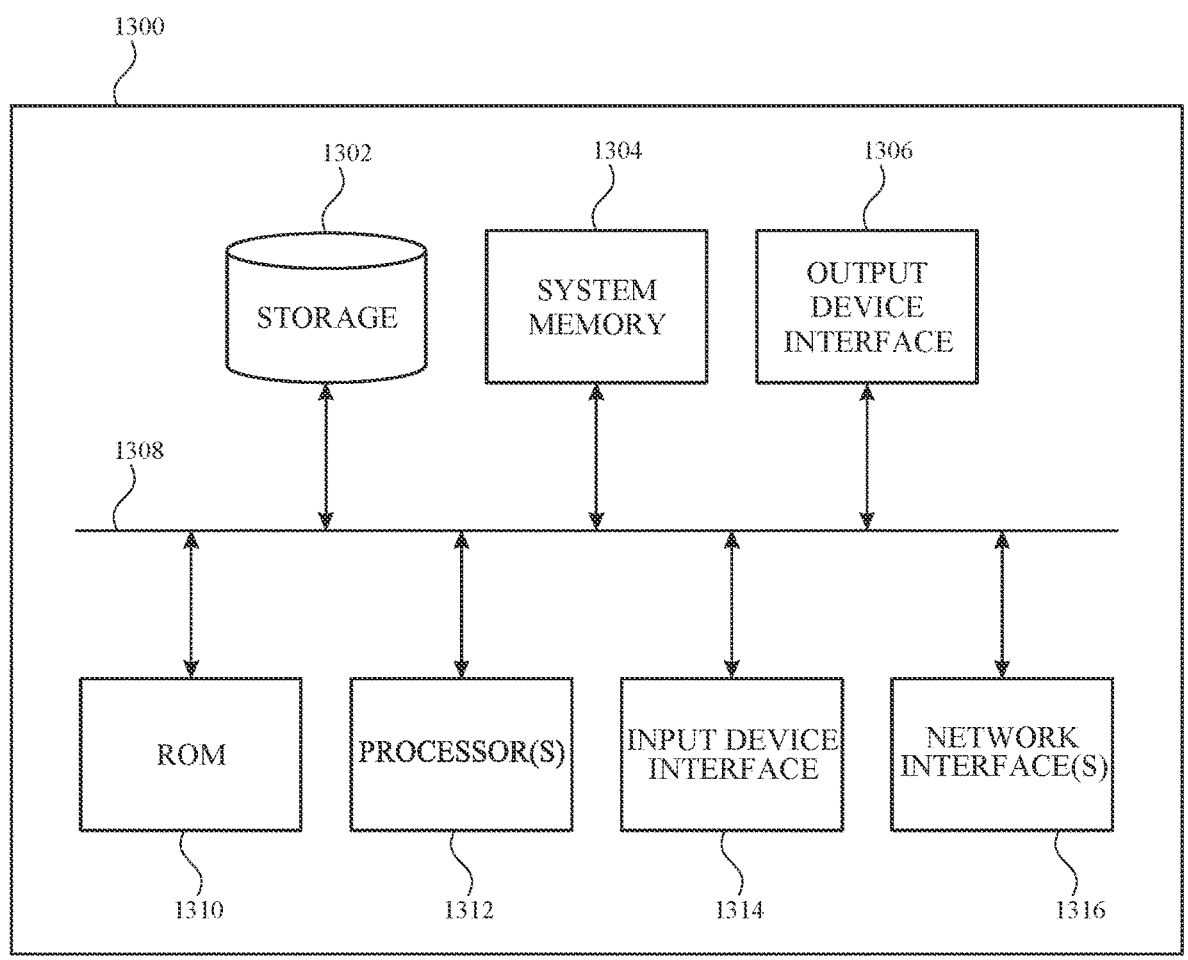
FIG. 13 illustrates an example electronic system with which aspects of the subject technology may be implemented in accordance with one or more implementations.

FIG. 13 illustrates an example electronic system 1300 with which aspects of the subject technology may be implemented in accordance with one or more implementations. The electronic system 1300 can be, and/or can be a part of, one or more of the electronic devices 102A-C, one or more of the secure devices 104A-B, and/or one or more of the service provider servers 120 shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, such as the electronic devices 102A-F shown in FIG. 1, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

As described above, aspects of the present technology may include the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include financial data, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A server device comprising:
a memory; and
at least one processor configured to:
receive, from a secure device, a notification that a digital credential of an accessor user account has been revoked at the secure device;
provide for transmission, to an electronic device associated with a primary authorized user account of the secure device, the notification that the digital credential has been revoked, wherein receipt of the notification triggers providing for transmission, from the electronic device to another electronic device associated with the accessor user account, of a revocation attestation request corresponding to the digital credential;
receive, from the other electronic device associated with the accessor user account, a revocation attestation that attests that the digital credential has been revoked at the other electronic device; and
store an indication that the digital credential has been revoked at the other electronic device.

2. The server device of claim 1, wherein the at least one processor is further configured to:
responsive to receipt of the revocation attestation from the other electronic device, verify the revocation attestation;
responsive to verification of the revocation attestation, providing for transmission, to the other electronic device associated with the accessor user account, a command to delete the digital credential at the other electronic device; and
receive, from the other electronic device, a deletion confirmation confirming that the digital credential has been deleted at the other electronic device.

3. The server device of claim 2, wherein the revocation attestation is signed by at least one of the digital credential or a private key corresponding to the digital credential.

4. The server device of claim 3, wherein the at least one processor is further configured to:
verify the revocation attestation using at least one of the digital credential or a public key that corresponds to the private key.

5. The server device of claim 4, wherein the indication that the digital credential has been revoked at the other electronic device and the other indication that the digital credential has been revoked at the secure device are stored at a key tracking server that is separate from the server device.

6. The server device of claim 1, wherein the at least one processor is further configured to:
store another indication that the digital credential has been revoked at the secure device.

7. A non-transitory computer-readable medium comprising instructions that, when executed by one or more processors, cause the one or more processors to perform operations comprising:
receiving, at an electronic device associated with a primary authorized user account for a secure device and from a server, a notification that a digital credential corresponding to an accessor user account has been revoked at the secure device;
providing, by the electronic device, a revocation request for transmission to another electronic device associated with the accessor user account; and
receiving, by the electronic device and from the other electronic device, a revocation attestation that attests that the digital credential has been revoked at the other electronic device.

8. The non-transitory computer-readable medium of claim 7, wherein the operations further comprise:
forwarding, by the electronic device, the revocation attestation to the server;
receiving, by the electronic device, an indication from the server that the digital credential has been marked as deleted at the server; and
responsive to receiving the indication, providing, by the electronic device and for transmission to the other electronic device, a command to delete the revoked digital credential at the other electronic device.

9. The non-transitory computer-readable medium of claim 7, wherein the revocation attestation is signed by at least one of the digital credential or a private key corresponding to the digital credential.

10. The non-transitory computer-readable medium of claim 7, wherein the operations further comprise:
responsive to receiving the notification, removing the digital credential from a user interface of the electronic device.

11. The non-transitory computer-readable medium of claim 10, wherein the operations further comprise:
prior to receiving the notification, receiving, via the user interface, a request to revoke the digital credential corresponding to the accessor user account at the secure device.

12. The non-transitory computer-readable medium of claim 11, wherein the operations further comprise:
prior to receiving the request to revoke the digital credential, receiving, via the user interface, a request to grant the digital credential to the accessor user account.

13. The non-transitory computer-readable medium of claim 7, wherein a fade-out policy is implemented for the digital credential at the secure device and a fade-out process for the digital credential is performed at the secure device.

14. The non-transitory computer-readable medium of claim 13, wherein another notification that the digital credential has been deleted at the secure device is provided for transmission from the secure device to the server responsive to deletion of the credential at the secure device.

15. The non-transitory computer-readable medium of claim 13, wherein performing the fade-out process at the secure device comprises downgrading a usability of the digital credential at the secure device over time in multiple steps.

16. The non-transitory computer-readable medium of claim 13, wherein the fade-out process for the digital credential is performed at the secure device responsive to receipt, via a user interface provided by the secure device, of a request to revoke the digital credential corresponding to the accessor user account.

17. The non-transitory computer-readable medium of claim 13, wherein the fade-out process for the digital credential is performed at the secure device responsive to receipt, via a communication link, of a request to revoke the digital credential from the server, wherein the communication link comprises at least one of a telematics link or a cellular data connection.

18. The non-transitory computer-readable medium of claim 17, wherein the request to revoke the digital credential originates from at least one of: a request received from the electronic device associated with the primary authorized user account of the secure device, or a request received from another electronic device associated with the accessor user account.

19. The non-transitory computer-readable medium of claim 18, wherein the request to revoke the digital credential originates from a request received through a web browser via a third electronic device that is distinct from the electronic device and the other electronic device.

20. A method comprising:
- receiving, at an electronic device associated with a primary authorized user account for a secure device and from a server, a notification that a digital credential corresponding to an accessor user account has been revoked at the secure device;
- providing, by the electronic device, a revocation request for transmission to another electronic device associated with the accessor user account; and
- receiving, by the electronic device and from the other electronic device, a revocation attestation that attests that the digital credential has been revoked at the other electronic device.

* * * * *

UNITED STATES PATENT AND TRADEMARK OFFICE
CERTIFICATE OF CORRECTION

PATENT NO. : 12,265,605 B2
APPLICATION NO. : 17/943155
DATED : April 1, 2025
INVENTOR(S) : Matthias Lerch et al.

Page 1 of 1

It is certified that error appears in the above-identified patent and that said Letters Patent is hereby corrected as shown below:

In the Claims

Column 21, Line 30 (Claim 2): Replace "providing for transmission," with --provide for transmission,--.

Signed and Sealed this
Twenty-fourth Day of June, 2025

Coke Morgan Stewart
*Acting Director of the United States Patent and Trademark Office*